Aug. 19, 1969   G. MAYER   3,462,127
SYSTEM FOR MEASURING THE RADIATION PATH IN A LASER
Filed April 29, 1964

United States Patent Office 3,462,127
Patented Aug. 19, 1969

3,462,127
SYSTEM FOR MEASURING THE RADIATION PATH IN A LASER
Guy Mayer, Paris, France, assignor to CSF—Compagnie Generale de Telegraphie Sans Fil, a corporation of France
Filed Apr. 29, 1964, Ser. No. 363,487
Claims priority, application France, May 10, 1963, 934,362
Int. Cl. G01b 9/02
U.S. Cl. 356—106          5 Claims

ABSTRACT OF THE DISCLOSURE

The invention relates to laser devices used for measuring changes in the optical length of a pencil of light which travels between two mirrors. The arrangement comprises an active material and pumping means for setting up along two optical paths having a common portion, respective laser radiations having different polarizations; each optical path ends at one side on separate mirrors, and at the other side on a common semi-transparent mirror beyond which are provided means for sensing the beat frequency of the above mentioned radiations. Separator means are inserted between the active material and the two first mentioned mirrors for splitting said paths.

---

The present invention relates to stimulated radiation sources or lasers and more particularly to the measuring of path lengths covered by the radiation emitted by a laser between the two reflectors thereof. This path length, will be hereinafter designated for brevity as the "optical path."

It is known to make such a measure by means of another reference laser, which emits light at a constant frequency, its optical path, which determines its frequency, having a known fixed length.

The second laser, the optical path of which it is desired to measure, has an identical active body which is submitted to the action of the same pump. The two lasers are arranged in such a way that the wave fronts generated thereby are parallel and means are provided for measuring the beats of these waves.

Such an arrangement has certain drawbacks:

(a) Variation of thermal or mechanical conditions may affect in different manners the two optical paths, since they do not coincide;

(b) The waves are to be parallel, say to within $5 \times 10^{-5}$ Rad. in order to obtain the desired beats.

It is an object of the invention to provide a system free from these defects.

According to the invention, only one active body and only one pump are used and means are provided for deriving therefrom two standing waves having distinct rectilinear polarization directions orthogonal to each other. The respective optical paths of these radiations are defined by one common mirror at one end of the active body and two respective mirrors at the other end.

Figure 1:
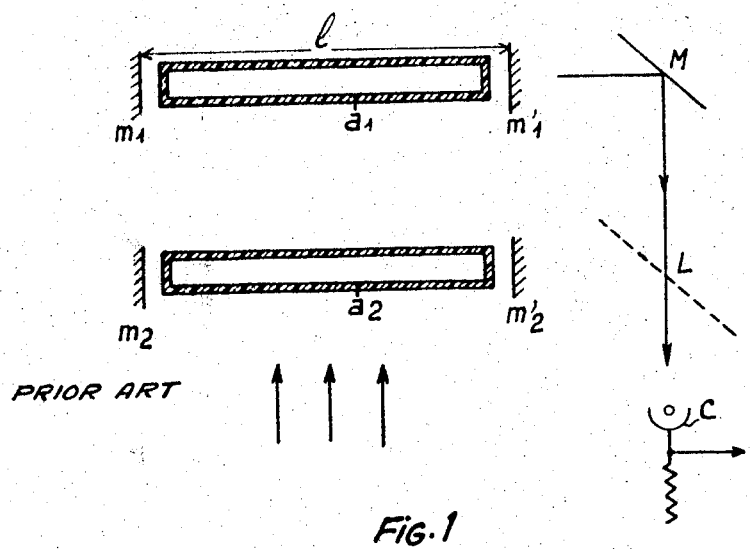
Figure 2:
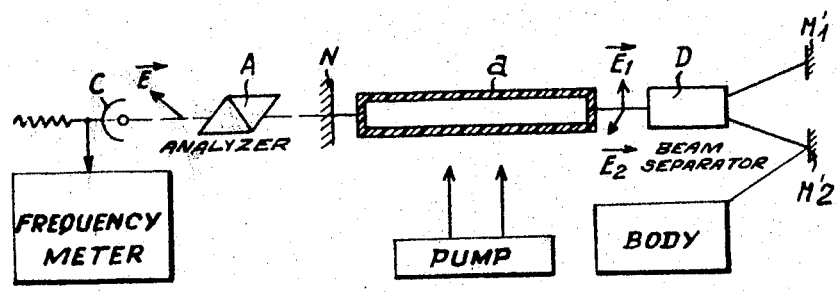

The invention will be better understood from the following specification and appended diagrammatic drawing wherein:

FIG. 1 shows a known arrangement; and
FIG. 2 shows one embodiment of the invention.

The arrangement shown in FIG. 1 comprises two lasers which are operated simultaneously and are parallel to each other. They comprise identical active bodies $a_1$ and $a_2$, which are excited by the same pump.

Active body $a_1$ is positioned between a fixed mirror $m_1$ and a fixed transparent mirror $m'_1$. The active body $a_2$ is positioned between a movable semi-transparent mirror $m'_2$ and a fixed mirror $m_2$. The optical path $m_1$, $m'_1$ of laser $a_1$ is constant and known. A mirror M and a semi-transparent silver coated blade L are positioned for directing the waves from both sources onto a photoelectric cell C.

It can be shown that any variation $\delta l$ of the optical path of laser $a_2$ yields a variation of the frequency of the emitted wave by $\delta f$, thus giving rise to a beat $\delta f$ at the output of cell C.

As is well known, a laser comprises a light amplifying medium which is a gas or a solid body, in a resonant cavity incorporating two mirrors, between which is placed the active material.

The bandwidth of the active substance may be of the order of 500 megacycles for a central frequency in the order of $f = 3.10^{14}$ cycles/sec. As long as the gain is higher than the losses caused by diffraction or reflection on both mirrors, the device will operate as an oscillator in the $f \pm \Delta f$ band. The oscillation frequency is determined by the dimensions and the geometry of the cavity. In a cavity such as the one shown in FIG. 1, i.e. where the two opposite walls are built up by the mirrors, the frequency is such that the distance $l$ between the two mirrors is merely equal to an integral number of half wavelengths, i.e. $l = n.\lambda/2$.

It results that, for a given cavity, the successive frequencies are spaced by $\Delta f = c/2l$, $c$ being the velocity of light. For $l = 50$ cm., $\Delta f = 300$ mcs.

The cavity resonance bandwidth is in the order of one megacycle, if both mirrors have a high reflecting power.

Since this band is very narrow, frequency variation can be measured with great precision. They are due to the variations of the dimensions of the cavity, i.e. of the distance between the mirrors i.e. of the optical path in accordance with the relation $$\delta f/f = -\delta l/l$$

A variation $\delta l$ by one angstrom of an optical path equal to 50 cm. in a laser will yield a frequency variation of $\delta f = 60$ kcs.

However such an arrangement has certain drawbacks:

(a) Variations in thermal and mechanical conditions may variously affect the reference optical path $m_1$, $m'_1$ and the optical path to be measured $m_2$, $m'_2$, since they are physically distinct over the whole of their respective lengths;

(b) Both waves have to be strictly parallel for cell C to operate correctly as a mixer.

The arrangement according to the invention shown in FIG. 2 avoids to a great extent the first and avoids entirely the second of the two above mentioned drawbacks. This arrangement comprises a single active body $a$ associated with an optical pump P, with a semi-transparent mirror N at one of its ends and two mirrors $M'_1$ and $M'_2$ at the other end. Between body $a$ and mirrors $M'_1$ and $M'_2$ and in the vicinity of body $a$ is inserted a beam splitting device D of known type such as a birefringent prism, capable of separating the radiations according to their respective polarizations $$\vec{E_1} \text{ and } \vec{E_2}$$

and to direct them respectively onto mirrors $M'_1$ and $M'_2$.

Photoelectric cell C is positioned for receiving the waves propagating through the semi-transparent mirror N. Between mirror N and cell C, is inserted an analyser $\overline{A}$, which produces linearly polarized light whose direction of vibration is at 45° with respect to polarization directions $$\vec{E_1} \text{ and } \vec{E_2}$$

A conventional meter F is coupled to cell C for measuring the heat frequency of the output signal. This frequency is a function of the difference between the two optical paths.

Separator D separates the waves according to their mutually perpendicular polarization directions $$\vec{E}_1 \text{ and } \vec{E}_2$$

and directs them respectively onto reference mirror $M'_1$ and mirror $M'_2$, whose displacements are to be measured. Thus, between mirror N and separator D, two standing systems coexist, with different frequencies, which systems are independent of each other, because their respective polarization directions are mutually perpendicular. There is thus no coupling between them.

The respective frequencies of the two waves depend on their respective optical paths $NM'_1$ and $NM'_2$. Beyond mirror N, in the direction of cell C, the two waves have parallel wave fronts.

Crystal A rotates by 45° the respective polarization directions of the two standing waves, thus providing a beat in cell C.

The arrangement according to the invention makes it possible to measure extremely small displacements, by rigidly connecting a body B whose displacements are to be measured with mirror $M'_2$. It also makes it possible to measure the index of refraction of a substance placed between separator D and mirror $M'_2$.

The minimum measurable variation of the optical path is of the order of $10^{-12}$ cm.

Of course, the invention is not limited to the embodiment described and shown. Thus, for example, mirror N may have the same location in FIG. 2 or in FIG. 1.

What is claimed is:

1. An arrangement for measuring by means of a laser source the optical length difference between one optical path and another optical path lying between mirrors of said laser source, said arrangement comprising: an active body having two ends, a first semi-transparent mirror at one of said ends and optical pump means for activating said body, a second fixed, reference mirror at said other end; a third mirror at said other end; said body, and said first and second mirrors lying along said one optical path and said body, said first and third mirrors lying along said other optical path; means for directing on said second mirror, a portion of the energy released by said active body and for directing on said third mirror, remaining portion of the energy released by said active body, and further means positioned beyond said semi-transparent mirror for collecting the transmitted portion of said energies, said further means being responsive to the beat frequency of said collected energies.

2. An arrangement for measuring by means of a laser source the optical length difference between one optical path and another optical path lying between mirrors of said laser source, said arrangement comprising: an active body having two ends, a first semi-transparent mirror at one of said ends and optical pump means for activating said body, said first mirror being common to both said paths; said one path being intercepted by a second fixed mirror at said other end; said other laser path being intercepted by a third mirror at said other end; means for directing on said second mirror the light waves generated by said body and polarized in a first direction and for directing on said third mirror the light waves generated by said body and polarized in a second direction; and further means positioned beyond said first semi-transparent mirror for collecting the transmitted light waves, said further means being responsive to the beat frequency of said collected light waves.

3. An arrangement for measuring by means of a laser source the optical length difference between one optical path and another optical path lying between mirrors of said laser source, said arrangement comprising: an active body having two ends, a first semi-transparent mirror at one of said ends and optical pump means for activating said body, said body, and first mirror being common to both said paths; said laser source including along said one path a second fixed reference mirror at said other end; said laser source having along said other path a third mirror at said other end; polarization separator means for directing on said second mirror the light waves generated by said body and polarized in a first direction and for directing, on said third mirror, the light waves generated by said body and polarized in a second direction normal to said first direction; analyser means positioned beyond said semi-transparent mirror for collecting the transmitted light waves, said analyser means having a polarization direction at an angle of 45° with said direction; and further means positioned beyond said last mentioned means, and responsive to the beat frequency of the light waves propagating beyond said semi-transparent mirror.

4. An arrangement for measuring by means of a laser source the optical length difference between one optical path and another optical path lying betwen mirrors of said laser source, said arrangement comprising: an active body having two ends, a semi-transparent mirror at one of said ends and optical pump means for activating said body, said body and said mirror being common to both said paths; said laser source including along said one path a second fixed reference mirror at said other end; said laser source having along said other path a third mirror at said other end; polarization separator means for directing on said second mirror the light waves generated by said body and polarized in a first direction and for directing on said third mirror the light waves generated by said body and polarized in a second direction normal by said body direction; analyser means positioned beyond said semi-transparent mirror for collecting the transmitted light waves, said analyser means having a polarization direction at an angle of 45° with said directions; a photoelectric cell for receiving the light waves transmitted by said semi-transparent mirror; and frequency meter means coupled to said cell.

5. A system for measuring by means of a laser source the displacement of a body, said system comprising: an active body having two ends, a semi-transparent mirror at one of said ends and optical pump means for activating said active body, a second, fixed, reference mirror positioned at said other end; a third mirror positioned at said other end for rigid association with said body; means for directing on said second mirror the light waves generated by said active body and polarized in a first direction and for directing on said third mirror the light waves generated by said active body and polarized in a second direction; and means positioned beyond said semi-transparent mirror for collecting the transmitted light waves, said means being responsive to the beat frequency of said collected light waves propagating beyond said semi-transparent mirror.

No references cited.

RONALD L. WIBERT, Primary Examiner

ORVILLE B. CHEW II, Assistant Examiner